United States Patent [19]

Ludwig

[11] Patent Number: 5,505,972

[45] Date of Patent: * Apr. 9, 1996

[54] DIFFERENTIAL INJECTION OF POULTRY PARTS

[75] Inventor: Wolfgang Ludwig, Highland, N.Y.

[73] Assignee: WTI, Inc., Highland, N.Y.

[ * ] Notice: The portion of the term of this patent subsequent to Nov. 22, 2014, has been disclaimed.

[21] Appl. No.: 435,578

[22] Filed: May 5, 1995

Related U.S. Application Data

[63] Continuation-in-part of Ser. No. 343,371, Nov. 22, 1994, Pat. No. 5,449,524.

[51] Int. Cl.$^6$ .................................................. A23L 1/315
[52] U.S. Cl. ................................... 426/281; 426/644
[58] Field of Search ............................ 426/281, 644; 99/532, 533

[56] References Cited

U.S. PATENT DOCUMENTS

| | | | |
|---|---|---|---|
| 2,709,658 | 5/1955 | Buchanan | 426/281 |
| 3,399,063 | 8/1968 | Schwall et al. | 426/281 |
| 3,511,164 | 5/1970 | Strandine | 99/532 |
| 3,528,820 | 9/1970 | Schwall et al. | 426/281 |
| 3,556,809 | 1/1971 | Strandine | 426/281 |
| 3,682,087 | 8/1972 | Panek | 99/533 |
| 3,754,302 | 8/1973 | Blair | 426/281 X |
| 3,850,090 | 11/1974 | Walters | 99/533 |
| 3,946,117 | 3/1976 | Blair | 426/281 |
| 4,074,389 | 2/1978 | Blair | 99/533 |

FOREIGN PATENT DOCUMENTS

| | | | |
|---|---|---|---|
| 0297592 | 1/1989 | European Pat. Off. | 426/281 |
| 1576124 | 7/1990 | U.S.S.R. | 426/281 |
| 2030841 | 1/1980 | United Kingdom | 426/644 |

*Primary Examiner*—Arthur L. Corbin
*Attorney, Agent, or Firm*—Herbert Dubno

[57] ABSTRACT

Poultry parts are differentially injected with the same or different marinates, especially to provide a greater proportion of the marinating solution in the breast portions than in the leg and other portions. The differential injection is accomplished by providing a greater flow cross section of the needles in the breast portion than in the leg and other portions for greater numbers of needles at the breast portion than at the leg and other portions, and/or by pumping the solutions at a greater rate to the breast portions than to the leg and other portions.

17 Claims, 4 Drawing Sheets

DIFFERENTIAL INJECTION OF POULTRY PARTS

CROSS REFERENCE TO RELATED APPLICATION

This application is a continuation in part of Ser. No. 08/343,371 filed Nov. 22, 1994, now U.S. Pat. No. 5,449,524.

FIELD OF THE INVENTION

My present invention relates to the treatment of poultry and, more particularly, to a method of treating poultry meat to improve the qualities thereof after cooking, especially by roasting.

BACKGROUND OF THE INVENTION

It is known to inject poultry carcasses with solutions containing flavor-enhancers, preservatives, substances which promote tenderness, juiciness and fattiness, and texture modifiers so that the cooked product, upon eating, can be of improved quality.

For example, in my U.S. Pat. No. 5,302,406 and a application Ser. No. 08/190,652, now U.S. Pat. No. 5,436,017 I have described a method of inhibiting bacterial growth in meat by injecting, inter alia, a citrate solution into poultry.

In these systems, as well as in the following U.S. Pat. Nos. 3,850,090, 3,754,302, 3,682,087, 3,682,088, 3,556,809, 3,511,164, 4,074,389 and 3,946,117, aqueous solutions containing salts and vegetable oil emulsions may be injected into the meat tissue of a poultry carcass to substantial concentrations therein for a variety of purposes.

In cooking processes, for example, roasting on a rotating spit, i.e. in a rotisserie, however, it is frequently observed that the product is drier in certain regions and more moist in others, thereby giving the consumer the impression that the product is less well cooked and even raw in certain regions and more well cooked and perhaps even over-done in others.

In general, the breast meat of poultry tends to give the impression of being less moist and thigh, drumstick, (leg) and wing portions of a poultry carcass may give the impression of being more moist or even raw in some cases and undercooked in others.

By and large, the injection of poultry with needles has attempted to introduce the aqueous solution uniformly at all points at which the needle pierces the carcass. As a consequence, the needle arrangement was such that the percentage of the solution at injection would be expected to be the same at all points at which the injection takes place, i.e. throughout the meat of the carcass including the breast and other portions such as the thigh, drumsticks or leg and wings.

In practice, however, with a uniform array of needles piercing both the breast and the drumstick or leg portions, the proportion of the solution in the meat may not be the same at all locations because of the configuration of the carcass, the different depths to which the needles may penetrate the flesh, the different degrees to which the flesh at the various locations takes up the solution, etc. It is therefore not uncommon that, while the needle array is uniform, all the needles have the same flow cross section, the same solution pressure is applied to all needles and, indeed, every attempt is made to bring about a uniform solution contained in the meat of the breast and legs, the solution concentration may be greater in the leg regions than in the breast.

As a result, after the cooking process, the leg portions may appear to be excessively moist while the breast may appear to be excessively dry and the consumer may have the mistaken impression from the greater moisture content of the leg meat, that the leg portions of the carcass are undercooked. The problem is accentuated if the overall injection of the solution is increased to reduce dryness in the breast and efforts to obviate the problem by reducing the total proportion of the solution in the carcass can result in excessively dry breast meat.

I have now found that, surprisingly, the effect mentioned above may be a result of the attempt at uniformity with which such solutions have been injected into the poultry meat heretofore.

OBJECTS OF THE INVENTION

It is the principal object of the present invention, therefore, to provide an improved process for treating meat, especially to overcome the drawbacks of earlier processes with respect to after-cooked qualities of the product.

Another object is to provide an improved method of treating poultry so that, after cooking, all parts of the poultry appear to be uniformly moist and to be equally well cooked.

Still another object of the invention is to provide an improved system for the injection of poultry products, enabling the improved method to be practiced and producing poultry carcasses which can be cooked more uniformly.

It is also an object of the invention to provide an improved method of treating poultry which extends the principles of the above-identified application Ser. No. 08/343,371, now U.S. Pat. No. 5,449,529.

SUMMARY OF THE INVENTION

I have found that it is possible to differentially inject poultry carcasses to thereby provide during the injection process, greater concentrations of the injected solution at certain regions of the poultry carcass and lesser concentrations of the injected solution at other portions so that, upon cooking, the meat of the carcass appears to have uniform moisture content throughout.

More particularly, according to the above-mentioned application, the method of treating poultry carcasses having a breast and other portions including thigh portions, leg portions and wing portions connected to the breast, can comprise the steps of:

(a) injecting into meat of the breast a first aqueous solution of a material selected from the group which consists of flavor, tenderness, juiciness and fattiness enhancers in an amount sufficient to attain on injection a certain first concentration of the solution in the meat of the breast; and (b) injecting into meat of the other portions at least one second aqueous solution of a material selected from the group which consists of flavor, tenderness, juiciness and fattiness enhancers in an amount sufficient to attain on injection a certain second concentration of the second solution in the meat of the other portions different from the first concentration.

In general, I may inject the solution to a higher concentration in the breast region and to a lower concentration in those regions, e.g. the wing and the drumstick, so that when roasting is complete, the moisture content appears to be uniform throughout the meat of the carcass, thereby eliminating any appearance of underdoneness in the leg regions, for example, concomitantly with any appearance of overdoneness and excessive dryness of the breast.

While that invention is applicable to all cooking processes, I have found that it is particularly valuable for use in the preparation of poultry carcasses for roasting, especially spit roasting in a rotisserie-type environment and especially for such enterprises as mass-produce roasted chickens and roasted chicken parts by rotisserie-type processes.

According to a feature of the invention, the first and second solutions may be of identical composition. However they may also be different, thereby allowing, for example, larger amounts of oily substance to be injected into the breast where the enhancement of a fattiness characteristic may be desirable.

The solution can be injected simultaneously into the carcass at the two locations thereon or can be sequentially injected when, for example, the breast being injected first and followed by injection of leg portions or other parts to be injected to a degree different from that utilized in the breast.

The important factor, of course, is the quantity per unit of injected volume of the liquid introduced into the poultry carcass. The difference in such quantity per unit volume of the meat of the carcass may be achieved by injecting the two solutions into the carcass at different pressures or by injecting the single solution into the different regions under different pressures.

Alternatively, the solutions may be injected differentially by utilizing the same pressure at the breast and other regions but providing the cross sectional flow area of the needle so that such area is greater in the breast regions than in other portions.

In particular, the invention can be carried out by injecting the breast portions and the leg portions with separate arrays of needles either concurrently or in succession and with different flow cross sections per unit area of the needle portion of the carcass. While in principle it may be advantageous in some cases to provide a greater injection quantity per unit area (specific injection) in the leg meat than in the breast meat, as a practical matter, for rotisserie-cooked chickens, it will be the breast meat which will be injected with a greater quantity of the solution per unit area and the leg meat which will have a specific injection quantity which is lower.

The injection of the breast portion and leg portions can be effected with the same solution, e.g. through needles having a greater flow cross section in the breast region than in the leg region, particularly needles which in the breast region may have a greater number of passages per needle than the needles injecting the leg portions.

Alternatively, the breast portions and leg portions may be injected with different solutions, e.g. a solution injected into the breast region which may have a greater content of an oil or fat than the solution injected into the leg portions. In that case, the solutions may be circulated through respective pump and filter systems.

In general, therefore, with the method described, the first and second solutions can be injected simultaneously into the carcass or injected at different times, can be injected at the same pressures or at different pressures, can be injected with different numbers of needles per unit area of injection or with needles of the same injection density, i.e. numbers of needles per unit area, and with needles with greater flow cross section or the same cross section at the different regions.

Preferably the carcass is roasted after injection utilizing the principles of this invention on a spit and, if desired, the carcass after injection and prior to roasting can be stored for a time, preferably after chilling.

While any marinating-type of solution can be used for the present invention which has been found to be advantageous for injection of poultry carcasses before cooking, the usual solution for the purposes of the present invention can include one or more flavoring substances such as salt and, if desired, flavoring agents like dehydrated onion or garlic or extracts thereof, pepper, and other spices, at least one tenderness enhancer and/or preservative, for example, one or more phosphates, and one or more juiciness or fattiness enhancers, usually a dehydrated chicken fat, a vegetable oil such as olive oil, butter or the like.

In the embodiment of the invention in which different solutions are injected into the different portions, the solution may have different compositions. In particular the oil or fat introduced into the breast portion can make up a greater proportion of the solution which is there injected.

A typical distribution of the needles, solution of pumping pressures and choice of other parameters should be such that the solution is injected into the leg portions to make up say 10% thereof, i.e. to a 10% concentration in the leg portion, and to a 15% concentration in the breast portions ±5% in each case.

A typical solution can include 0.9 to 1.5% salt (sodium chloride) up to 0.5% of a phosphate suitable for injection, for example sodium phosphate, up to 1% of spices and to 1% of fat or oil in the case of the leg portions and up to 3% of fat or oil in the case of the breast portions.

I have now found that the foregoing principles are equally applicable to the treatment of poultry parts.

In many cases, it is advantageous to cook poultry parts or to supply poultry parts for cooking which are distinct from the whole bird. In that case, the poultry may be cut up into a number of portions, preferably four portions, including a breast portion, thigh portions, leg or drumstick portions and wing portions. Up to now, these portions were not treated with solutions in the manner described, or only certain of the poultry parts, for example, the breast portions, were treated by injection. In accordance with the present invention, however, in a single machine, utilizing the differential injection technique described above, I can forward the respective parts, i.e. the breast portion along one path, the thigh portions along another path, the drumstick or leg portions along a third path and the wing portions along a fourth path, while controlling the injection of the solution to obtain different concentrations of the desired products in the different parts.

As has been described previously, the different parts can be injected with needles which are different in number per unit area of injection, with needles which have different cross sections, with needles which are supplied with the same solution or different solutions under different pressures, with needles which are clustered and have different inter-needle spacings, etc., so that the meat of the different parts are injected with the respective concentrations as may be desired for optimum cooking, and especially roasting of the respective parts. The paths may be formed by respective belts or by respective tracks with a single belt and the injection of the different parts is carried out simultaneously in the same machine.

BRIEF DESCRIPTION OF THE DRAWINGS

The above and other objects, features, and advantages will become more readily apparent from the following description, reference being made to the accompanying drawing in which.

SPECIFIC DESCRIPTION

Figure 1:
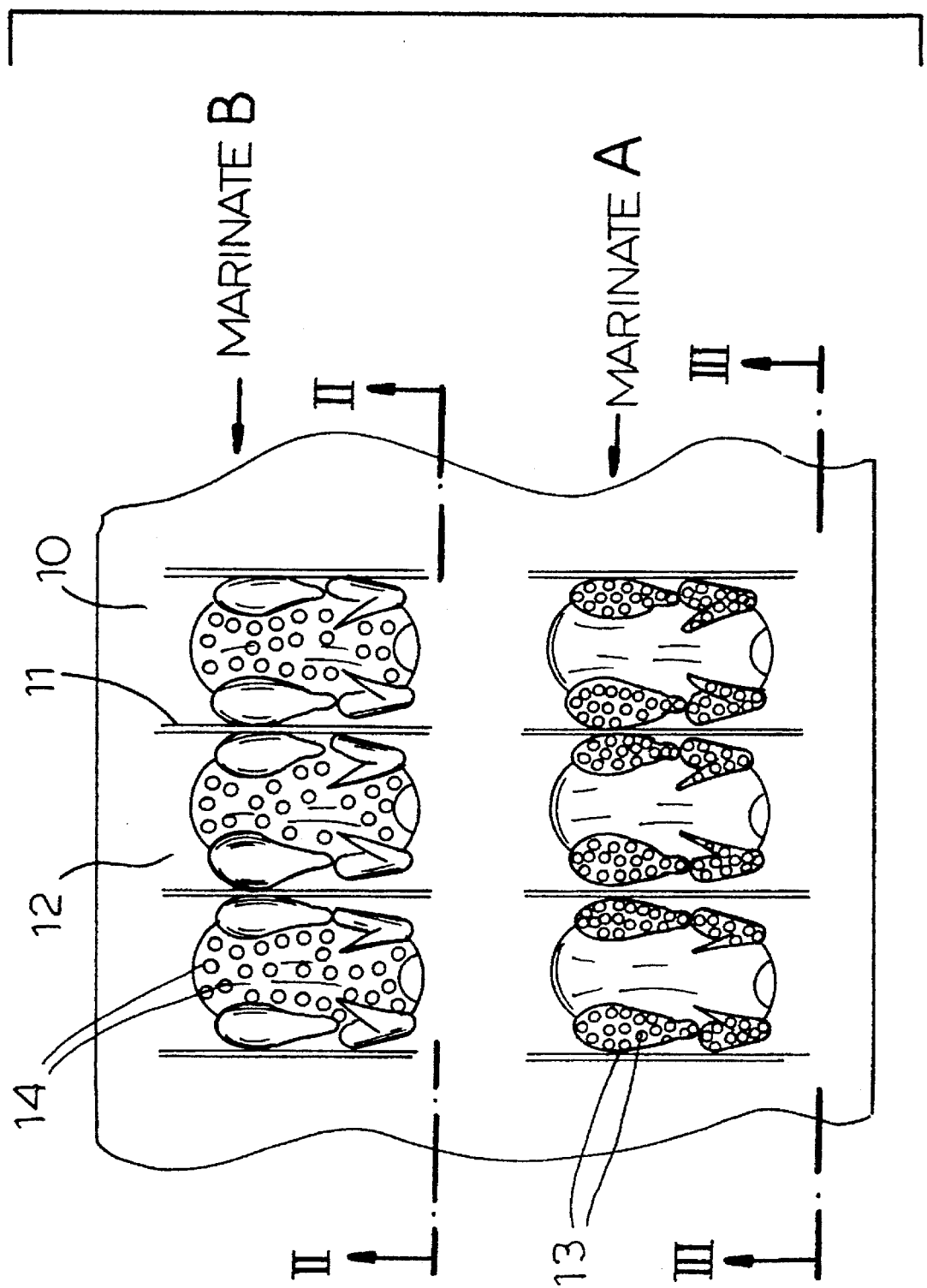
FIG. 1 is a plan view illustrating the principles of the invention in accordance with a first embodiment.

In FIG. 1 I have shown a transport belt 10 having partitions 11 separating compartments 12 from one another and each of the compartments having a respective poultry carcass therein oriented with the drumstick portions turned upwardly.

In a region A, a marinate A is injected into the carcass by needles represented at 13 and shown as dots in FIG. 1, disposed on a head which only injects the drumstick portions with that marinate A. As the carcass is moved further downstream to a region B, it is injected with a marinate B in the breast regions with needles 14 which differ from the needles used in injecting the leg portions, the two marinates being injected separately and being of different compositions.

Figure 3:
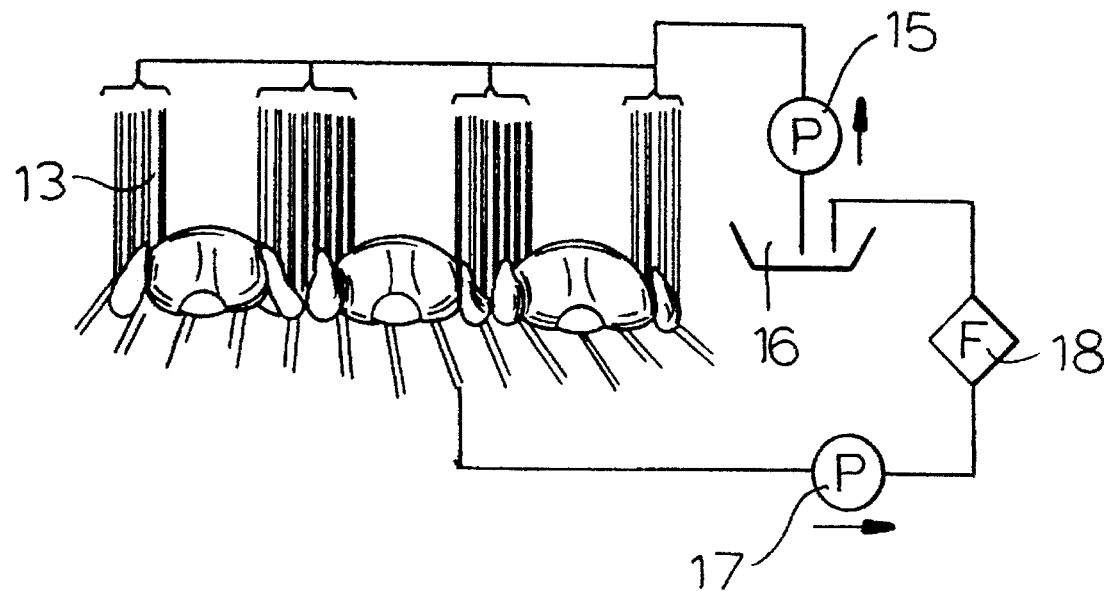
FIG. 3 is a cross sectional view taken along the line III—III of FIG. 1.

The marinate fed to the needles 13 (FIG. 3) are supplied by a pump 15 from a reservoir 16, the excess of the marinate being collected and returned by a pump 17 and a filter 18 to the vessel 16.

Correspondingly, the needles 14 receive the marinate B from a pump 25 and a reservoir 26, the excess being returned by a pump 27 through the filter 28 to the vessel 26.

EXAMPLE 1

Marinate A consists of an aqueous solution containing 1.2% by weight salt, 0.4% by weight of sodium phosphate, 0.8% of a mixture of garlic and onion extracts and 0.8% of dehydrated chicken fat which is dispersed in the solution.

The solution is injected with needles having a 3 mm outside diameter and a 1.5 mm inside diameter, laterally opening with four holes each of 1.2 mm diameter. The liquid is injected into the legs in an amount following the injection process of 8%.

Marinate B is injected into the breast portion in an amount of 15% and is identical to the marinate injected into the leg portion except that 3% of fat or oil is dispersed therein instead of 0.8%. Marinate B is injected through needles having a 3 mm outer diameter and a 1.5 mm inner diameter but having six lateral holes each with a 1.7 mm diameter. The needles for both the breast and leg portions can be spaced apart with the same spacings.

Alternatively needles with a 4 mm outer diameter and a 1.5 mm inner diameter with four or six lateral holes each of 1.2 mm to 1.7 mm diameter can be used for marinate B.

Figure 2:
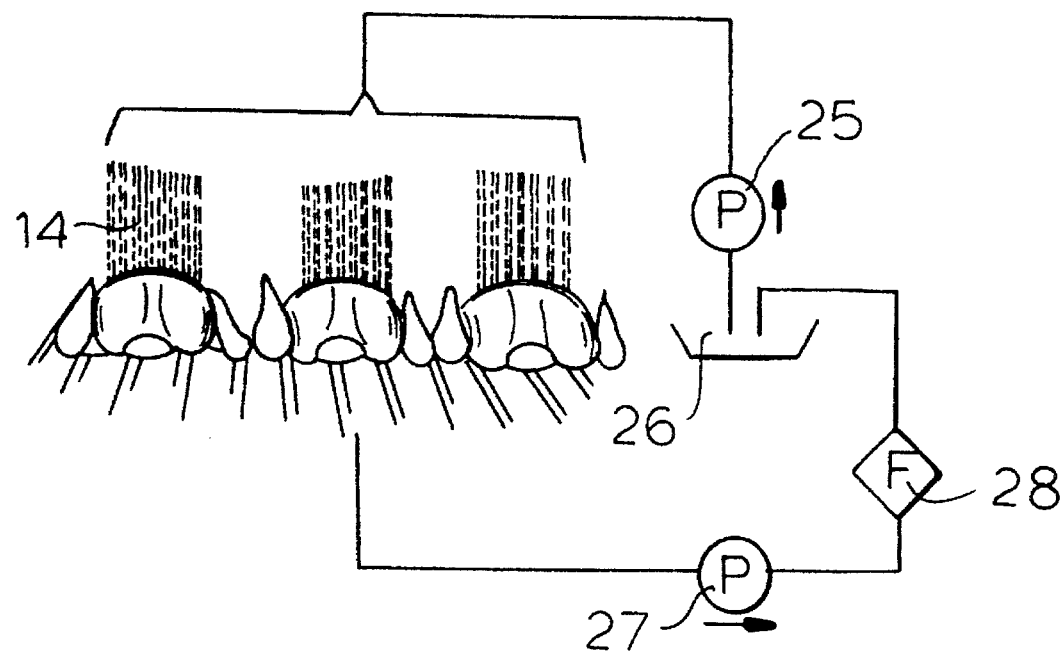
FIG. 2 is a cross sectional view taken along the line II—II of FIG. 1.
Figure 4:
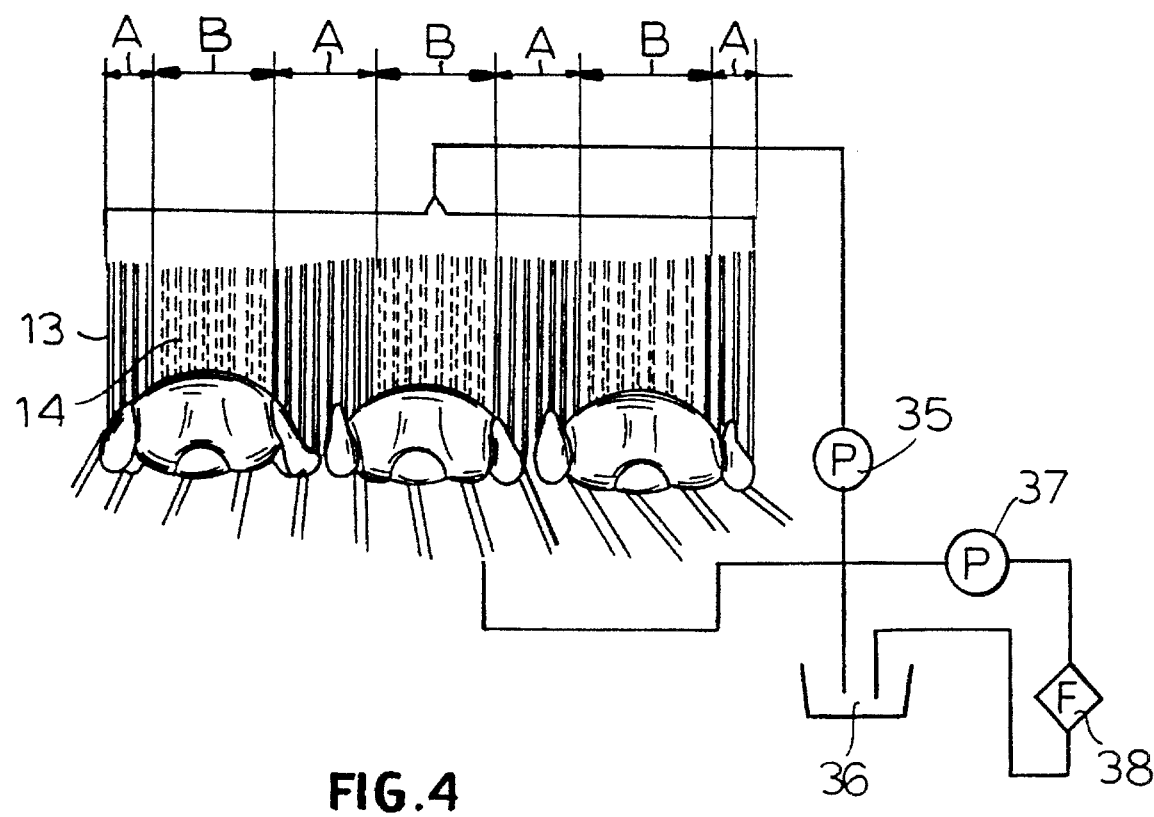
FIG. 4 is a view similar to FIGS. 2 and 3 illustrating another embodiment of the invention.
Figure 5:
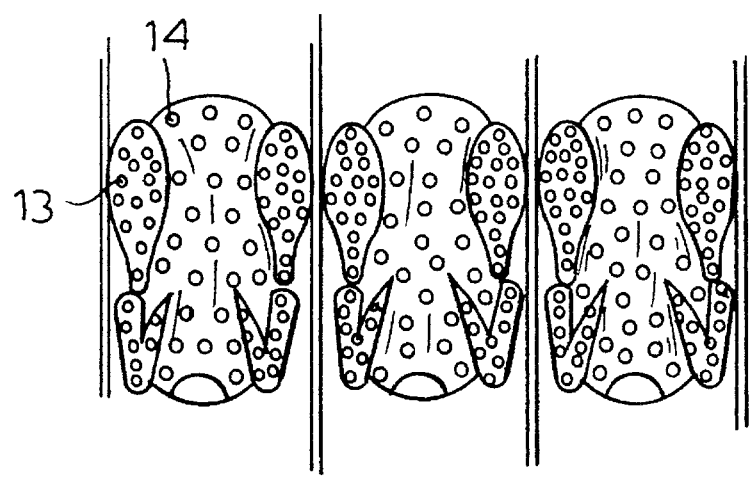
FIG. 5 is a plan view corresponding to FIG. 4.

In FIG. 4 I have shown an embodiment wherein all of the carcasses are injected with needles 13 and 14 in arrays A and B for respectively injecting the leg portions and the breast portions. Here all of the needles receive the same marinate from a vessel 36 via a pump 35, the cases being collected by a pump 37 and returned to the vessel 36 via the filter 38. In this embodiment, a single-head machine can be used as opposed to the double-head machine of FIGS. 1–3.

EXAMPLE 2

The marinate comprises an aqueous solution of 1.4% salt, 0.5% sodium phosphate, 1% spices (garlic and onion extracts) and 2% olive oil dispersed in the solution. In the regions A, the needles had a 3 mm outer diameter and 1.5 mm inner diameter laterally opening each through four lateral holes of 1.2 mm diameter.

The needles in regions B were of 3 mm outer diameter and 1.5 mm inner diameter each having six lateral holes opening laterally of 1.7 mm diameter.

Figure 6:
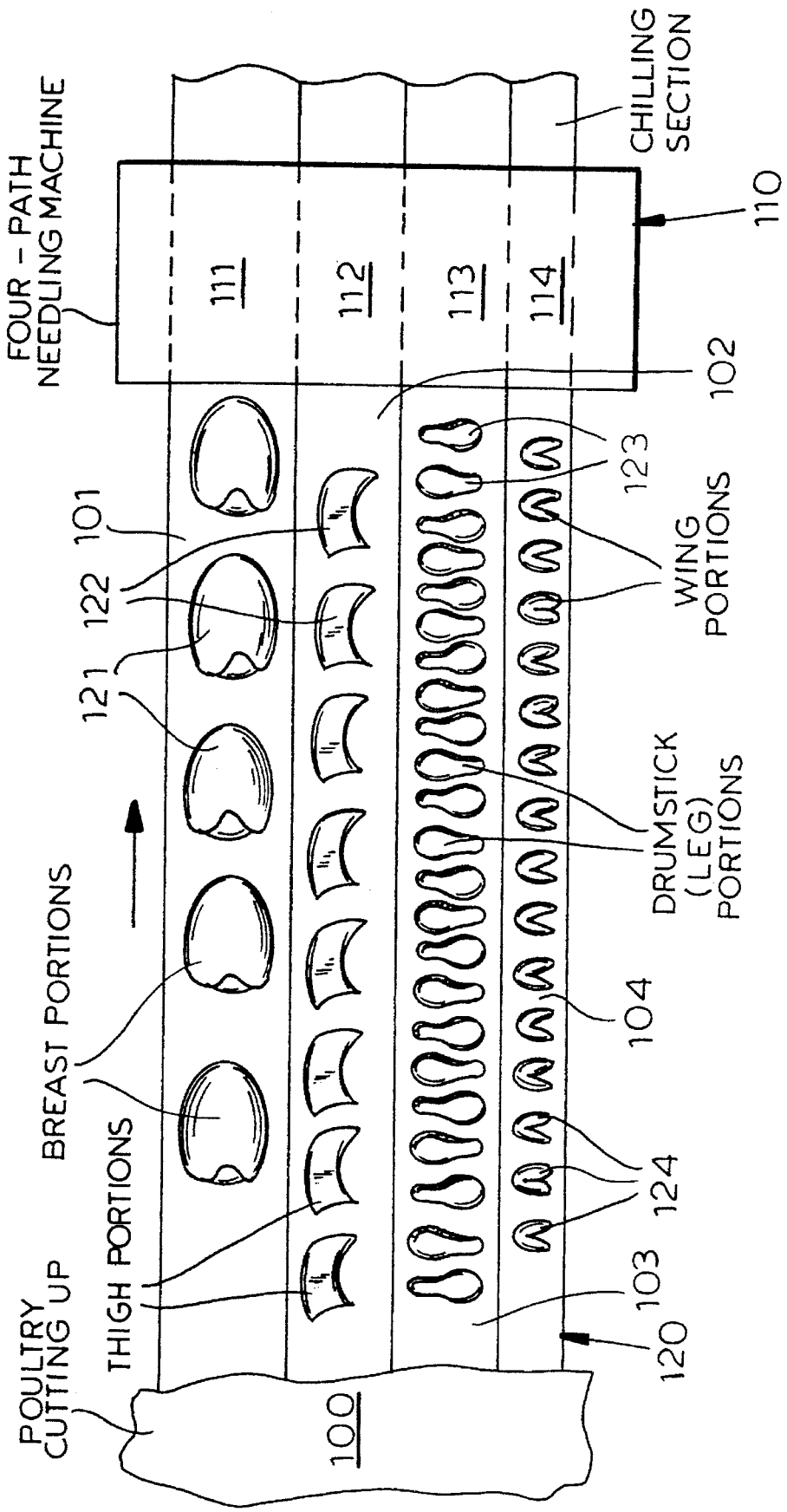
FIG. 6 is a plan view illustrating an apparatus for carrying out another aspect of the invention.

As can be seen from FIG. 6, differential injection can be carried out not on the whole bird but on poultry parts, if desired, in accordance with another aspect of the invention. In this case, the poultry treatment line can include a station 100 at which the poultry is cut up and a means for forwarding the parts of the cut up poultry to an injection machine 110 which can be generally of the type described but which is subdivided into zones, e.g. four zones, 111, 112, 114 and 114 with arrays of needles of different diameter, different spacings or both or supplied with the same or different solutions at different pressures so that the meat of the several parts of the bird are injected simultaneously but differentially in the manner described. The conveyor belt 120 supplying the machine 110 can comprise regions 101, 102, 103 and 104 carrying respectively the breast portions 121, the thigh portions 122, the drumsticks 123 and the wing portions 124 of the cut up poultry to the respective zones 111 through 114.

As can be seen from the previous Figures, the different needle spacings and needle diameters can induce solutions into the various parts of different concentrations.

The marinate used comprises an aqueous solution of 1.3% by weight salt, 0.45% by weight sodium phosphate, 0.9% by weight of spices including garlic and onion extracts and 1.5% by weight of olive oil. In the zone 111, the needles had a 3 mm outer diameter and 1.5 mm inner diameter, issuing the solution through six lateral holes of 1.7 mm diameter.

In zone 112, the needles had a 3 mm outer diameter and 1.5 mm inner diameter laterally opening through four lateral holes of 1.2 mm diameter per needle in the zone or region 113 of the machine, the needles of 3 mm outer diameter and 1.5 mm inner diameter each opened into the drumstick meat through two lateral holes of 1.1 mm diameter.

In the zone 114 of the machine the needles had the same inner and outer diameters as described but each needle opened into the wing meat through two lateral holes of 1 mm diameter each. In this embodiment, all of the needles had similar spacings in the various zones and the same marinate was pumped at the same pressure to all of the needles. However, it is possible to provide in the respective zones needles of different internal diameters, needles supplied with the marinate under different pressures and needles supplied with different marinates to vary the concentrations of the injected substances from one kind of poultry part to the next.

I claim:

1. A method of treating poultry carcasses having breast portion, thigh portions, leg portions and wing portions, said method comprising the steps of:

(a) subdividing each of said carcasses into at least two parts of different kinds, one of said parts being a breast portion of each respective carcass and another of said parts being at least one of the thigh, leg and wing portions of each respective carcass;

(b) forwarding the parts of one kind from a multiplicity of said carcasses along one path of a treatment line and the parts of another kind along another path of said treatment line through a treatment machine; and (c) in said machine and simultaneously:

(c$_1$) injecting into the meat of a succession of said of one kind, parts, as said parts are displaced along said one path, a first aqueous solution of a material selected from the group which consists of flavor, tenderness, juiciness and fattiness enhancers in an amount sufficient to attain a certain first concentration of said solution in the meat of said parts of one kind, and (c$_2$) injecting into meat of a succession of said parts of another kind, as said parts are displaced along said other path, a second aqueous solution of a material selected from the group which consists of flavor, tenderness, juiciness and fattiness enhancers in an amount sufficient to attain a certain second concentration of said second solution in the meat of said parts of another kind different from said first concentration.

2. The method defined in claim 1 wherein parts corresponding to each of said breast portions, said thigh portions, said leg portions and said wing portions are forwarded along respective paths through said machine and are injected simultaneously with the respective aqueous solutions.

3. The method defined in claim 1 wherein said solutions are injected into said parts along the respective paths at different pressures.

4. The method defined in claim 1 wherein said solutions are injected into said parts along the respective paths at the same pressure.

5. The method defined in claim 1 wherein said solutions are injected into the respective parts through needles of different cross sectional areas along the respective paths.

6. The method defined in claim 1 wherein said solutions are injected into the respective parts through needles of the same cross sectional area along the respective paths.

7. The method defined in claim 1 wherein said solutions are injected into the respective parts through needles of arrays of different numbers of needles per unit area along the respective paths.

8. The method defined in claim 1 wherein said solutions are injected into the respective parts through needles of arrays with the same number of needles per unit area along the respective paths.

9. The method defined in claim 1 wherein said solutions are injected into the respective parts through needles having different inter-needle spacings along the respective paths.

10. The method defined in claim 1 wherein said solutions are injected into the respective parts through needles having the same interneedle spacings along the respective paths.

11. The method defined in claim 1 wherein said solutions are injected into the respective parts through needles in clusters having different numbers of needles along the respective paths.

12. The method defined in claim 1 wherein said solutions are injected into the respective parts through needles in clusters having different internal diameters along the respective paths.

13. The method defined in claim 1 wherein said solutions are injected into the respective parts by arrays of needles having different flow cross sections for the respective paths.

14. The method defined in claim 1, further comprising the step of thereafter roasting the parts.

15. The method defined in claim 1, further comprising the step of thereafter chilling the parts.

16. The method defined in claim 15, further comprising the step of thereafter storing said parts.

17. The method defined in claim 1, further comprising the step of thereafter storing said parts.

\* \* \* \* \*